Figure 1:
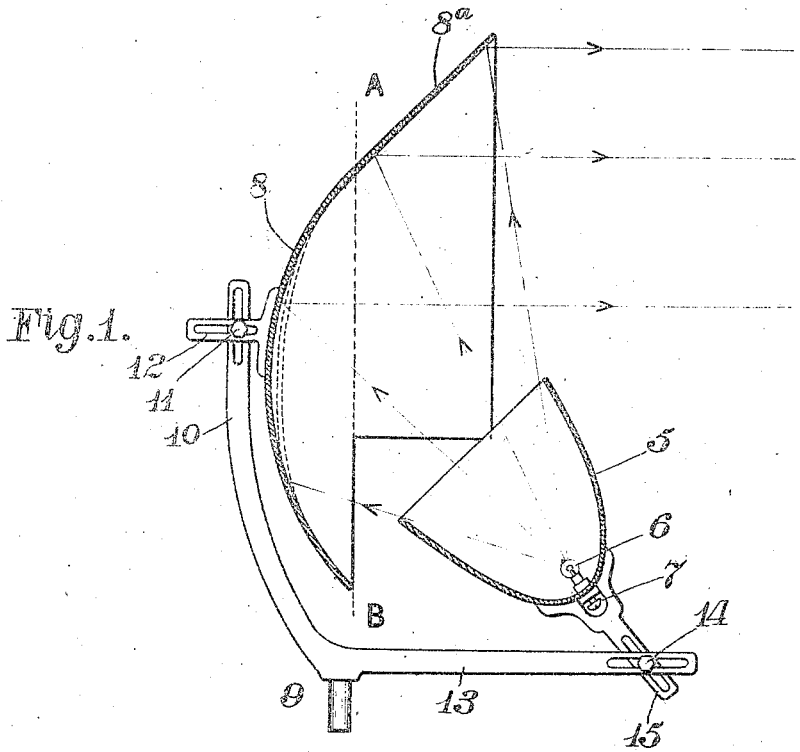

April 8, 1924.

C. T. BOYD ET AL

HEADLIGHT FOR MOTOR VEHICLES

Filed May 15, 1922

INVENTORS
CHARLES T. BOYD
PERRY B. CLARK
ATTYS.

Patented Apr. 8, 1924.

1,489,341

UNITED STATES PATENT OFFICE.

CHARLES T. BOYD AND PERRY B. CLARK, OF COLUMBUS, OHIO.

HEADLIGHT FOR MOTOR VEHICLES.

Application filed May 15, 1922. Serial No. 560,899.

*To all whom it may concern:*

Be it known that we, CHARLES T. BOYD and PERRY B. CLARK, citizens of the United States, residing at Columbus, in the county of Franklin and State of Ohio, have invented a certain new and useful Improvement in Headlights for Motor Vehicles, of which the following is a specification.

The chief object of the invention is to obtain for motor vehicles ample road illumination and an avoidance of the highly dangerous glare common with many forms of vehicle light.

The invention is embodied in the example herein shown and described, the features of novelty being finally claimed.

In the drawing attached hereto—

Figure 2:
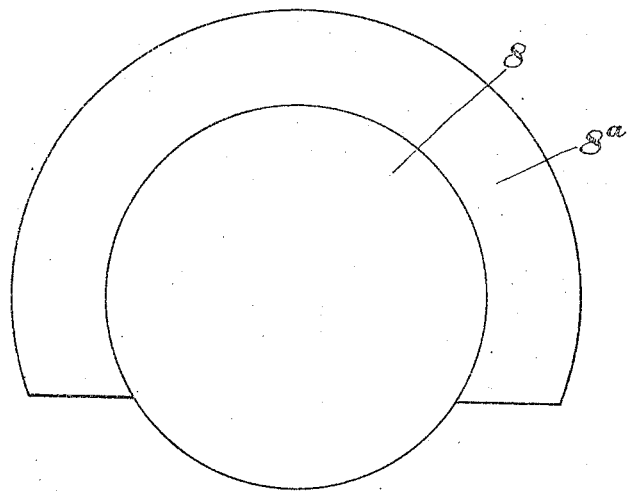

Figure 1 is mainly a central sectional view of the invention some parts being in full, and Fig. 2 is a front view of the rear or secondary reflector alone.

Like characters of reference designate corresponding parts in the two views.

The primary reflector 5 is of paraboloid form. Said reflector contains an ordinary electric lamp 6 constituting the source of illumination. The socket member or holder of the lamp 6 is provided with the usual adjusting screw 7 for adjusting it with respect to the focus of the reflector. The secondary or road illuminating reflector consists of a spherical segment 8 to the left of the line A—B Fig. 1 having a rim 8ª (also reflecting) extended from the periphery of the spherical segment as shown to the right of the line A—B in the form of a partial section of a truncated cone. The rim 8ª is shown to be substantially a tangential extension of the segment 8 with the two reflecting surfaces preferably blended as one. The segment 8 is not necessarily that of a true sphere but may, in some instances, be somewhat flattened so as to be aspherical as indicated by the adjacent broken lines so as to vary, for example, the focalizing of the light and prevent spherical aberration.

The two reflectors are arranged with respect to each other so that the direct and reflected rays from the paraboloid or primary reflector 5 are thrown mainly upward toward and upon the upper portion of the secondary reflector.

The two reflectors are shown as mounted upon a bracket 9 having one branch 10 slotted for connection by suitable clamping means 11 with a slotted arm 12 secured to the rear of the secondary reflector and another branch 13 slotted for connection by suitable clamping means 14 with a slotted stem 15 on the primary reflector. By these means either of the reflectors can be adjusted with reference to the other to obtain concentration or to make desired variations in the character or direction of the beam. In order to prevent considerable or strong rays from passing laterally into space beyond the rim of the secondary reflector the primary reflector should be so arranged with reference to the secondary reflector that the outermost direct rays from the lamp are intercepted within the edge of the conical extension of the secondary reflector as indicated on the drawing.

The beam obtained is a compound one of substantially parallel rays with a concentration of some rays due to the spherical or aspherical portion of the secondary reflector. The beam may be projected ahead or it may be deflected so as to strike the road at a particular required distance forward of the vehicle. Because the primary reflector screens the lamp from sending direct rays forward there is no glare and the road is illuminated with reflected rays only.

The relative size and the forms of the several parts can be changed without departing from the gist of the invention as claimed.

What we claim is:

A light for a vehicle comprising, in combination, a reflector consisting of a concave segment of substantially a sphere and a substantially tangential rim extension thereof in the form of a frustum of a cone and an illuminating reflector directed toward the first named reflector, said illuminating reflector constructed to have its rays confined substantially to said first named reflector and containing means for producing a light therein whereby a beam compounded longitudinally of a central concentrated portion inclosed by a less concentrated portion is produced.

CHARLES T. BOYD
PERRY B. CLARK